United States Patent [19]

Inoue et al.

[11] Patent Number: 5,068,908
[45] Date of Patent: Nov. 26, 1991

[54] METHOD AND APPARATUS FOR DETECTING MARK FROM IMAGE DATA

[75] Inventors: Yoichi Inoue, Tokyo; Akira Kasano, Kokubunji, both of Japan

[73] Assignee: Kabushiki Kaisha Toshiba, Kawasaki, Japan

[21] Appl. No.: 442,538

[22] Filed: Nov. 28, 1989

[30] Foreign Application Priority Data

Nov. 30, 1988 [JP] Japan ................................. 63-300902

[51] Int. Cl.$^5$ ............................................. G06K 9/52
[52] U.S. Cl. .......................................... 382/48; 382/22
[58] Field of Search ............................. 382/61, 48, 22; 235/462

[56] References Cited

U.S. PATENT DOCUMENTS

| | | | |
|---|---|---|---|
| 4,581,762 | 4/1986 | Lapidus et al. | 382/22 |
| 4,860,374 | 8/1989 | Murakami et al. | 382/28 |
| 4,920,572 | 4/1990 | Sugita et al. | 382/48 |

Primary Examiner—Leo H. Boudreau
Assistant Examiner—David Fox
Attorney, Agent, or Firm—Oblon, Spivak, McClelland, Maier & Neustadt

[57] ABSTRACT

An apparatus for detecting from first image data mark image data corresponding to a mark and having a first length in a first direction and a second length in a second direction perpendicular to the first direction in unit of pixels. The apparatus includes a differentiating processor, an adding processor and a controller. The differentiating processor executes differential operations for the first image data in response to first and second differential operation commands from the controller to obtain second and third image data and executes the differential operations for fourth image data in response to third and fourth differential operation commands from the controller to obtain fifth and sixth image data. The adding processor adds the second and third image data shifted by ½ the first length in opposite directions in response to the addition command from the controller to obtain the fourth image data and adds the fifth and sixth image data shifted by ½ the second length in opposite directions in response to the addition command from the controller to obtain seventh image data. The controller detects a center position of the mark from the seventh image data.

13 Claims, 7 Drawing Sheets

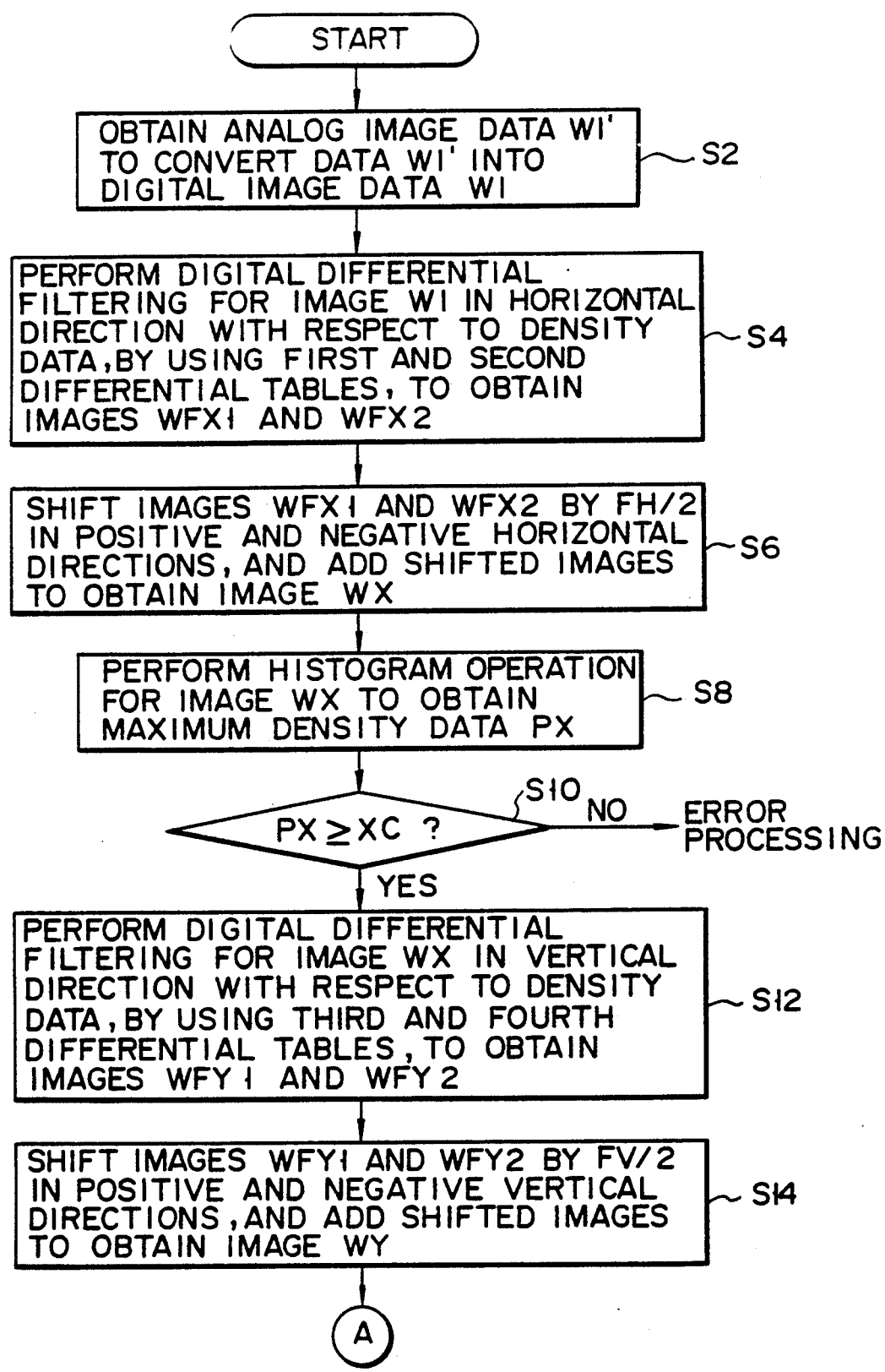
F I G. 5A

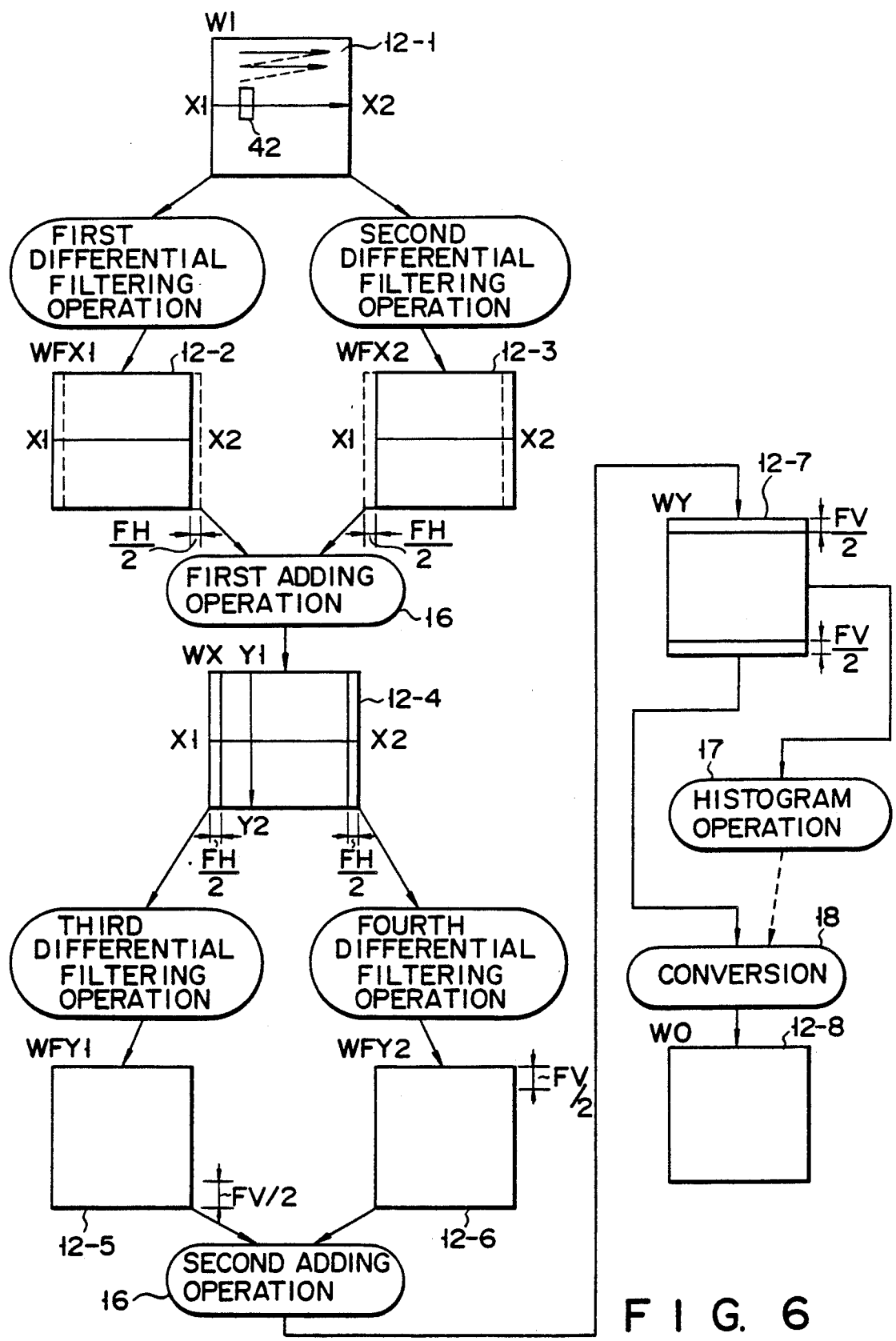
F I G. 6

METHOD AND APPARATUS FOR DETECTING MARK FROM IMAGE DATA

BACKGROUND OF THE INVENTION

1. Field of the Invention

The present invention relates to a method and apparatus for detecting mark image data corresponding to a mark from image data.

2. Description of the Related Art

In order to detect a mark, e.g., a rectangular mark, printed or written on paper on the basis of analog image data input through a camera or the like, mark image data itself corresponding to the mark or its central position must be detected. Assume, in this case, that desired mark image data represented by the image data has a horizontal length FH and a vertical length FV in units of pixels, as shown in FIG. 1.

In a conventional mark detecting apparatus, therefore, image data input through a camera or the like is converted into digital data first. Horizontal and vertical lengths FH' and FV' of actual mark image data in the digital image data are then measured. The measured lengths FH' and FV' are respectively compared with the known lengths FH and FV, and hence a rectangular mark is detected.

In the above method, in order to digitalize analog image data input through a camera or the like, each pixel is sampled from the analog image data, and the amplitude of the analog image data upon each sampling is converted into a binary value. As a result, the boundary of the mark image data is detected. That is, the density data of each pixel of the analog image data is compared with a threshold value. In accordance with the comparison result, the pixel is represented by binary data which indicates whether the pixel is present within the mark image data or not. However, the difference in density between the mark image data and another portion varies depending on external light radiated on the paper, or the like, on which the mark is written. As shown in FIG. 2A, therefore, if an actual threshold value is lower than a desired threshold value, mark image data smaller than the real one is detected. In contrast to this, as shown in FIG. 2B, if an actual threshold value is higher than a desired threshold value, mark image data larger than the real one is detected. As a result, the mark cannot be properly detected.

As described above, in the conventional mark detecting method, if input analog image data cannot be properly digitalized with a predetermined threshold value due to the influences of changes in external light, illumination from one direction, and the like, the lengths of mark image data cannot be properly measured, resulting in a decrease in mark detection precision.

SUMMARY OF THE INVENTION

The present invention has been made in consideration of the above situation, and has as its object to provide a method and an apparatus for detecting, with increased detection precision, the position of a mark (target area) on the basis of gradation display digital image data without being influenced by changes in external light, illumination from one direction, and the like.

In order to attain this object, the apparatus for detecting from first image data mark image data corresponding to a mark and having a first length in a first direction and a second length in a second direction perpendicular to the first direction in unit of pixels, includes:

a differentiating processor responsive to an input differential operation command, for executing a differential operation for density data of first designated image data;

an adding processor responsive to an input addition command, for adding second and third designated image data with respect to density data of them such that the second designated image data is shifted by a designated length in a designated direction and the third designated image data is shifted by the designated length in an opposite direction to the designated direction; and a controller responsive to an input mark detection command, for designating the first image data as the first designated image data to sequentially output first and second differential operation commands as the differential operation commands to the differentiating processor to obtain second and third image data, respectively, designating the second and third image data as the second and third designated image data, a half of the first length as the designated length and the first direction as the designated direction to output a first addition command as the addition command to the adding processor to obtain fourth image data, and designating the fourth image data as the first designated image data to sequentially output third and fourth differential operation commands as the differential operation commands to the differentiating processor to obtain fifth and sixth image data, respectively, designating the fifth and sixth image data as the second and third designated image data, a half of the second length as the designated length and the second direction as the designated direction to output a second addition command as the addition command to the adding processor to obtain seventh image data, and detecting a center position of the mark from the seventh image data.

In order to achieve the above object, according to the present invention, there is provided a method of detecting mark image data corresponding to a mark on the basis of first image data in a mark detecting apparatus, the mark image data having a first length in a first direction and a second length in a second direction, including the steps of:

obtaining second and third image data by executing first and second digital differential operations for the first image data in the first direction;

obtaining fourth image data by shifting the second and third image data by ½ the first length in the opposite directions and adding the shifted second and third image data together;

obtaining fifth and sixth image data by executing third and fourth digital differential operations for the fourth image data;

obtaining seventh image data by shifting the fifth and sixth image data by ½ the second length in the opposite directions and adding the shifted fifth and sixth image data together; and detecting the center of the mark from the seventh image data.

As described above, according to the present invention, since differential filtering operations are performed for digital image data having gradation display density data, the position of a mark can be detected without converting input analog image data into binary data. Therefore, a threshold value is free from the influences of changes in external light, illumination from one direction, and the like, and the mark detection precision is increased.

BRIEF DESCRIPTION OF THE DRAWINGS

FIGS. 5A and 5B are flow charts for explaining an operation of the embodiment;

FIG. 6 is a view for explaining the operation;

DETAILED DESCRIPTION OF THE PREFERRED EMBODIMENT

A mark detecting apparatus according to an embodiment of the present invention will now be described in detail below with reference to the accompanying drawings.

Figure 1:
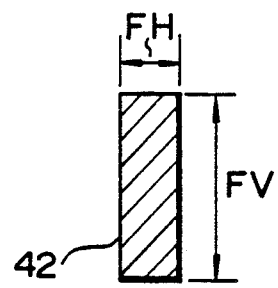
FIG. 1 is a view for explaining a mark to be detected.
Figure 2A:
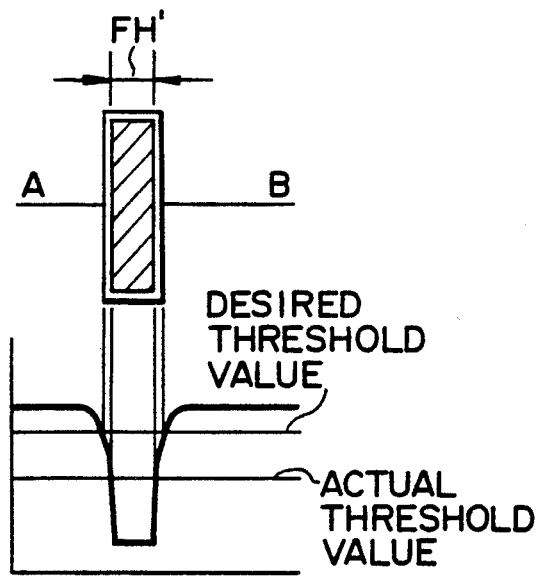
FIGS. 2A and 2B are views for explaining a conventional mark detecting method.
Figure 2B:
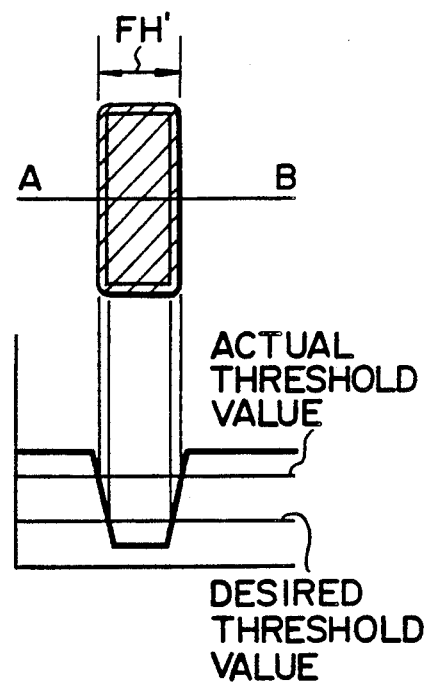
Figure 3:
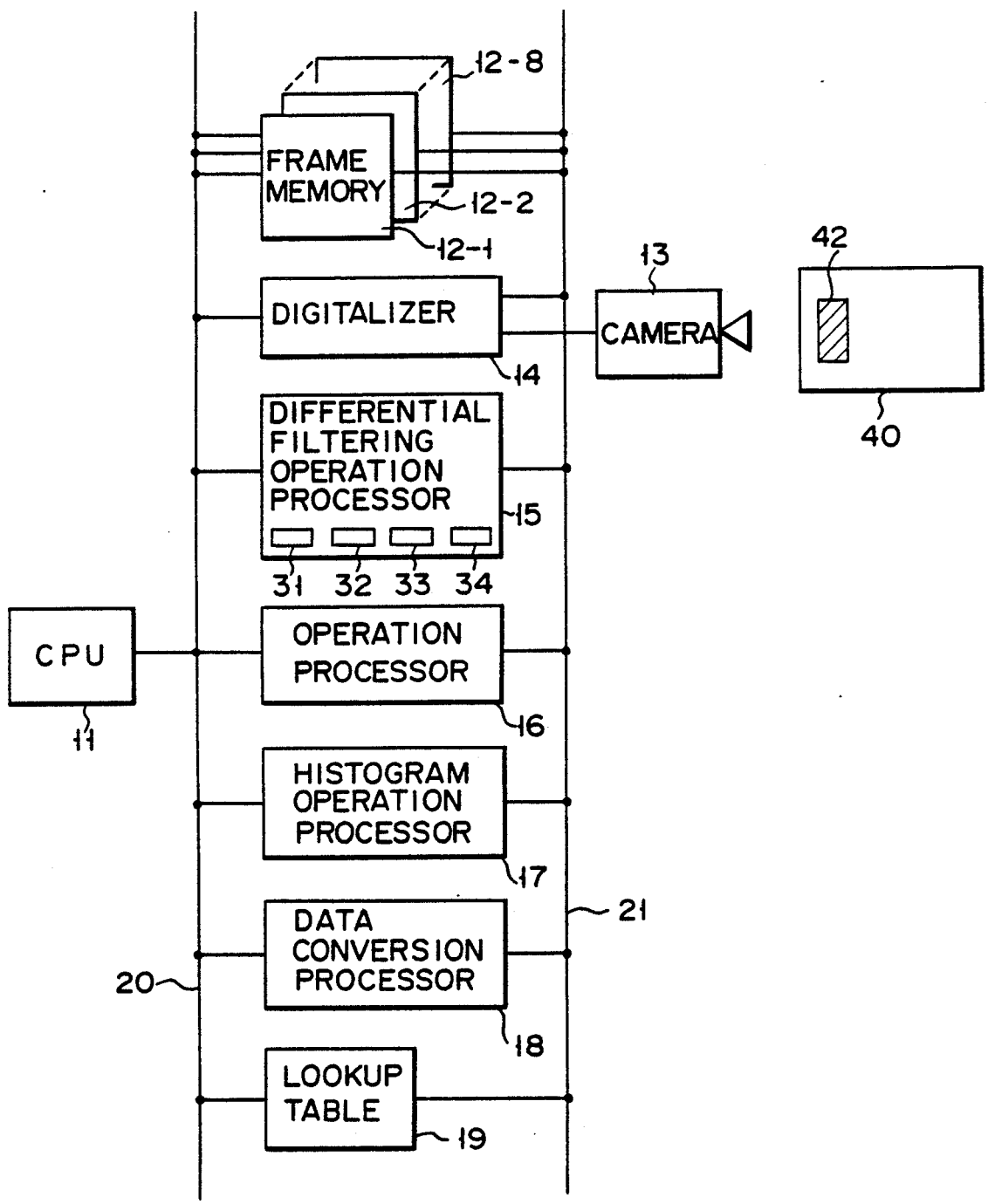
FIG. 3 is a block diagram showing an arrangement of a mark detecting apparatus according to an embodiment of the present invention.

An arrangement of the embodiment will be described first with reference to FIG. 3. Referring to FIG. 3, a CPU 11 generates various commands in response to an input mark detection instruction so as to control the overall apparatus. Each of two-dimensional frame memories 12-1, 12-2, ..., 12-8 can store image data having, e.g., 8-bit gradation (256 levels) data as density data.

A camera 13 receives analog image data WI' including mark image data corresponding to a rectangular mark under the control of the CPU 11 through a digitalizer 14. The digitalizer 14 controls the camera 13 in response to an imaging command from the CPU 11, samples the analog image data WI' from the camera 13, and converts it into digital image data WI consisting of a plurality of pixels. At this time, the amplitudes of the analog image data WI' upon sampling are converted into 8-bit digital density data. That is, the image data WI has 8-bit gradation data as density data. The image data WI is stored in the frame memory 12-1.

In response to first to fourth differential filtering operation commands from the CPU 11, a differential filtering operation processor 15 performs differential filtering operations for the density data of each pixel of image data stored in a designated frame memory by using a differential filtering table, and obtains image data having the operation results as density data. The processor 15 has differential filtering tables 31, 32, 33, and 34 respectively shown in FIGS. 4A, 4B, 4C, and 4D. These tables are respectively used for the first to fourth differential filtering operations.

An operation processor 16 adds the density data of the respective pixels of image data stored in two designated frame memories together in response to an addition command from the CPU 11, and obtains image data having the operation results as density data. In addition, the processor 16 calculates the center of gravity of a designated area of image data in response to a center of gravity operation command from the CPU 11. A histogram operation processor 17 obtains the density histogram of designated image data in response to a histogram operation command from the CPU 11.

The CPU 11 generates a lookup table in accordance with the histogram operation result. In response to a data conversion command from the CPU 11, a data conversion processor 18 converts designated image data in accordance with the lookup table. A table memory 19 stores the lookup table. A control bus 20 allows the CPU 11 to control the frame memories 12-1 to 12-8, the digitalizer 14, the processors 15 to 18, and the lookup table 19. An image data bus 21 is used to perform transfer of image data between the frame memories 12-1 to 12-8, the digitalizer 14, the processors 15 to 18, and the lookup table 19.

Figure 5B:
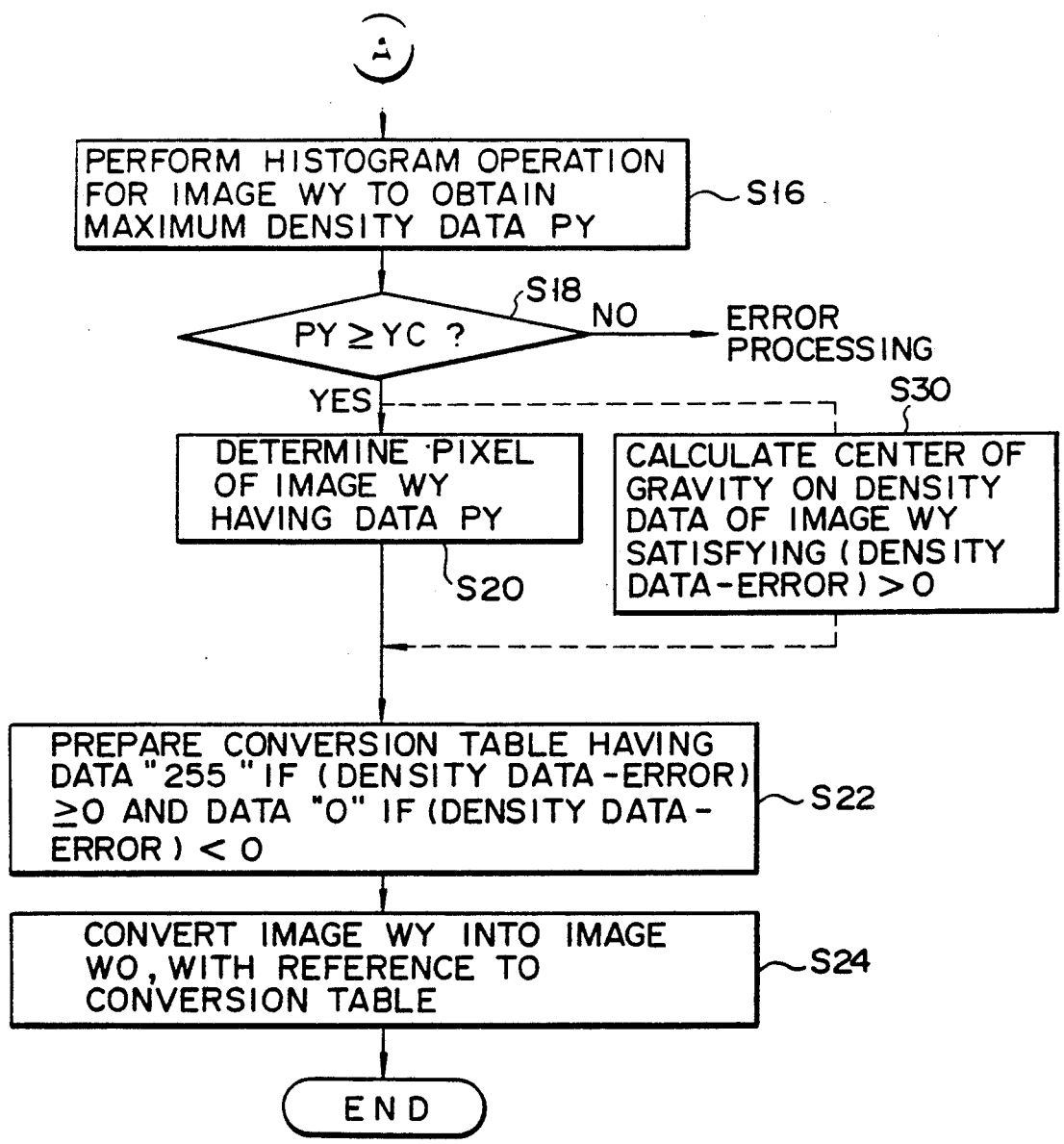

An operation of the mark detecting apparatus according to the embodiment of the present invention will now be described below with reference to FIGS. 5A and 5B. Assume, in this case, that horizontal and vertical lengths FH and FV of mark image data corresponding to a rectangular mark in digital image data are predetermined in units of pixels, and FH<FV. Assume, in addition, that the rectangular mark is a black mark on a white background, and the density data of each pixel of digital image data is represented by eight bits.

Figure 7A:
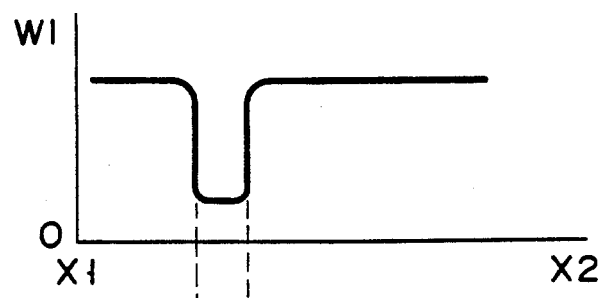
FIGS. 7A to 7D are views respectively showing image data WI, WFX1, WFX2, and WX obtained when the horizontal position of a mark is detected.

In step S2, the CPU 11 outputs an imaging command to the digitalizer 14 in response to an input mark detection instruction. In response to the imaging command, the digitalizer 14 controls the camera 13 so as to photograph a mark 42 written on paper 40 and to output analog image data WI' to the digitalizer 14. The digitalizer 14 digitalizes the analog image data WI' from the camera 13 in order to obtain digital image data WI consisting of a plurality of pixels. At the same time, the digitalizer 14 converts the amplitude of each pixel of the analog image data WI' into 8-bit density data. The digital image data WI is stored in the frame memory 12-1. FIG. 7A shows a state of changes in density data of the image data WI between positions X1 and X2 shown in FIG. 6. Upon completion of storage of the image data WI, the digitalizer 14 outputs an end ACK (acknowledge) to the CPU 11.

Figures 4A, 4B, 4C, 4D, 8, 9A, 9B, 9C, 9D, 10A, 10B, 10C, 10D:
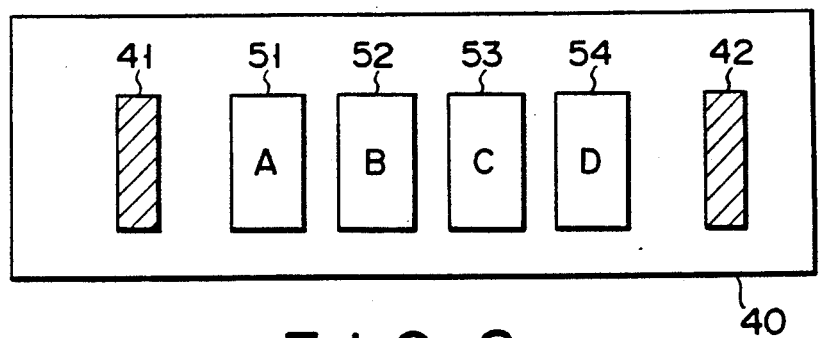
FIGS. 4A to 4D are views respectively showing differential filtering tables used in the embodiment shown in FIG. 3.
FIG. 8 is a view for explaining a case wherein the mark detecting apparatus in FIG. 3 is used.
FIGS. 9A to 9D and 10A to 10D are views respectively showing modifications of the differential filtering tables in FIG. 4.
Figure 7B:
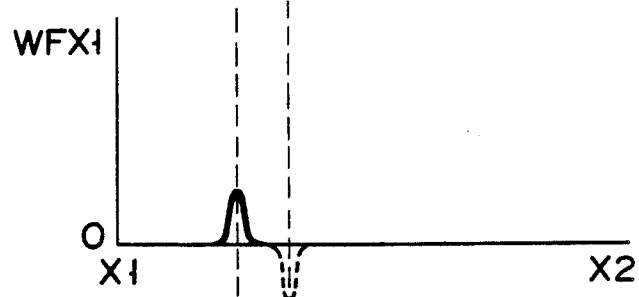

In step S4, in response to the end ACK from the digitalizer 14, the CPU 11 supplies a first differential filtering operation command for the image data WI to the differential filtering operation processor 15 through the control bus 20. In response to the command from the CPU 11, the processor 15 sequentially reads out each pixel of the image data WI from the frame memory 12-1 in a direction of from the position X1 to the position X2 through the image data bus 21, as shown in FIG. 6. The readout image data WI is subjected to a differential filtering operation using the differential filtering table 31 so as to obtain image data WFX1. FIG. 4A shows the content of the table 31. As is apparent from FIG. 4A, the differential filtering operation is executed by using eight pixels around a target pixel. In this case, the density data of each pixel located closer to the position X2 than the target pixel is multiplied by a factor of 2, and the density data of each pixel located closer to the position X1 than the target pixel is multiplied by a factor of −2. As a result, the image data WFX1 has the operation results obtained by using the table 31 as density data. FIG. 7B shows the differential filtering operation results between the positions X1 and X2 in the case wherein the table 31 is used. As is apparent from the image data WFX1 in FIG. 7B, changes in density data from white to black are represented by positive values, whereas changes from black to white are represented by negative values. As is indicated by the dotted lines, if a differential operation result is a negative value, the differential value is represented by "0". Subsequently, the processor 15 stores the image data WFX1 in the frame memory 12-2 through the image data bus 21, and outputs a first differential filtering operation end ACK to the CPU 11.

Figure 7C:
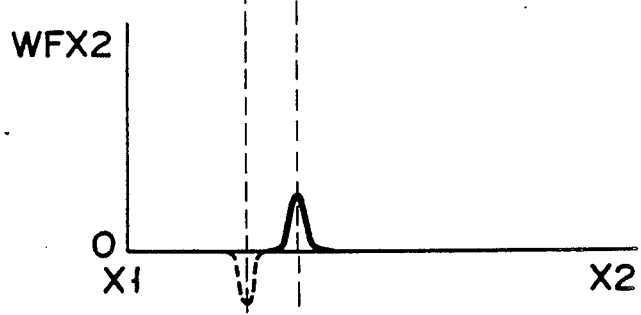

In response to the end ACK from the processor 15, the CPU 11 supplies a second differential filtering operation command for the image data WI to the processor 15 through the control bus 20. In response to the operation command from the CPU 11, in order to obtain image data WFX2, the processor 15 executes a differential filtering operation for the image data WI by using the differential filtering table 32 in the same manner as in the operation of obtaining the image data WFX1. As is apparent from FIG. 4B, each factor of the table 32 has the same absolute value as that of a corresponding factor of the table 31 but has the opposite sign thereto. As a result, a positive differential value is obtained when density data is changed from black to white. FIG. 7C shows the image data WFX2 between the positions X1 and X2. Similarly, in FIG. 7C, each negative differential value indicated by a dotted line is represented by "0". After storing the image data WFX2 in the frame memory 12-3, the processor 15 outputs an end ACK to the CPU 11 through the control bus 20.

In step S6, in response to the end ACK from the processor 15, the CPU 11 outputs an addition command to the operation processor 16 through the control bus 20 so as to add the image data WFX1 and WFX2 together. In response to the addition command, the operation processor 16 reads the differential image data WFX1 and WFX2 from the frame memories 12-2 and 12-3, respectively. The processor 16 then shifts the image data WFX1 and WFX2 by FH/2 in directions X2 and X1, respectively. Thereafter, the processor 16 adds the density data of the corresponding pixels of both the image data to obtain image data WX. More specifically, the processor 16 generates read addresses (AX−FH/2) and (AX+FH/2) from a reference pixel address AX, and outputs them to the frame memories 12-2 and 12-3, respectively. As a result, the density data of corresponding pixels are read out and added together. All the pixels are scanned by using the reference pixel address. The image data WX is written at the reference pixel address AX of the frame memory 12-4.

Figure 7D:
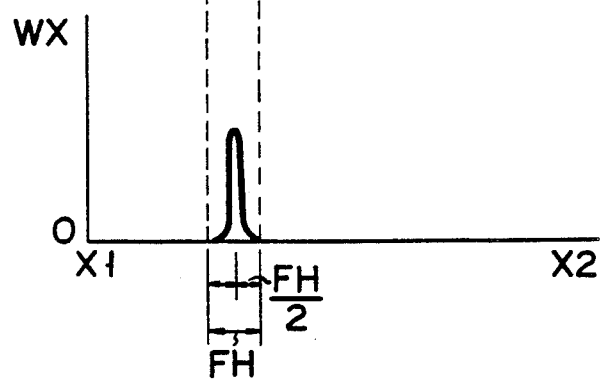

This image data WX becomes image data having a peak at the center of the horizontal length FH of the rectangular mark 42, as shown in FIG. 7D. This peak always appears at the center of any back pattern on a horizontal line as long as it has a horizontal length FH, regardless of whether it is a rectangular mark or not. On the contrary, no peak appears even in a rectangular mark if its horizontal length is not FH. In the case shown in FIG. 6, the image data WX having a peak pattern at a portion which coincides with the central axis, in the vertical direction, of a rectangular mark (indicated by a black pattern) included in the image data WI is obtained in the frame memory 12-4. After this operation, the processor 16 outputs an end ACK to the CPU 11.

In response to the end ACK from the processor 16, the CPU 11 outputs a histogram operation command to the histogram operation processor 17 in step S8. In response to this command from the CPU 11, the processor 17 obtains the maximum density data PX by executing a histogram operation for the image data WX. In step S10, the CPU 11 checks whether the maximum density data PX is equal to or larger than a predetermined value XC. If the maximum density data PX is smaller than the value XC, it is determined that no mark is present in the image data WI, and hence error processing is performed. If the maximum density data is equal to or larger than the value XC, i.e., Y in step S10, the operation in step S12 is executed.

In step S12, the CPU 11 supplies a third differential filtering operation command for the image data WX to the differential filtering operation processor 15 through the control bus 20. In response to the command from the CPU 11, the processor 15 reads out the image data WX from the frame memory 12-4 through the image data bus 21. The readout image data WX is subjected to differential filtering operations using the differential filtering table 33 so as to obtain image data WFY1. As a result, the image data WFY1 has the operation results, which are obtained by using the table 33 shown in FIG. 4C, as density data. As is apparent from FIG. 4C, changes in density data from white to black and from black to white between positions Y1 and Y2 in the differential filtering operations are respectively represented by positive and negative values. If a differential operation result is negative, the differential value is represented by "0". Subsequently, the processor 15 stores the image data WFY1 in the frame memory 12-5 through the image data bus 21, and outputs an end ACK to the CPU 11.

In response to the ACK from the processor 15, the CPU 11 supplies a fourth differential filtering operation command for the image data WX to the processor 15 through the control bus 20. In response to the operation command from the CPU 11, in order to obtain image data WFY2, the processor 15 executes differential filtering operations for the image data WX by using the differential filtering table 34 in the same manner as in the operation of obtaining the image data WFY1. As is apparent from FIG. 4D, each element of the table 34 has the same absolute value as that of a corresponding factor of the table 33 but has the opposite sign thereto. As a result, a positive differential value is obtained when each density data changes from black to white. Similarly, in this case, a negative differential value is represented by "0". The processor 15 stores the image data WFY2 in the frame memory 12-7, and subsequently outputs an end ACK to the CPU 11.

In step S14, in response to the ACK from the processor 15, the CPU 11 supplies an addition command to the operation processor 16 through the control bus 20 so as to obtain image data WY by adding the image data WFY1 and WFY2 together in the same manner as in the operation of obtaining the image data WX. In response to the addition command, the processor 16 reads out the differential image data WFY1 and WFY2 from the frame memories 12-5 and 12-6, respectively. The processor 16 shifts the image data WFY1 and WFY2 by FV/2 in directions Y2 and Y1, respectively. Thereafter, the processor 16 adds the density data of the corresponding pixels of both the sifted image data, and obtains image data WY. More specifically, the processor 16 generates read addresses (AY−FV/2) and (AY+F/2) from a reference pixel address AY, and outputs them to the frame memories 12-5 and 12-6, respectively. With this operation, the processor 16 reads out corresponding pixels, and adds their density data together. All the pixels are scanned by using the reference pixel address. The image data WY is written at the reference pixel address AY of the frame memory 12-7. Thereafter, the processor 16 outputs an end ACK to the CPU 11.

In step S16, in response to the ACK from the processor 16, the CPU 11 supplies a histogram operation command to the histogram operation processor 17. In response to the command from the CPU 11, the processor 17 executes a histogram operation for the image data WY. The CPU 11 obtains a maximum value PY of the density data on the basis of the density histogram of the image data WY obtained by the histogram operation processor 17. In step S18, the CPU 11 checks whether the maximum density data PY is equal to or larger than a predetermined value YC. If the data PY is smaller than the value YC, it is determined that no mark is present in the image data WI, and hence error processing is executed. If the data PY is equal to or larger than the value YC, i.e., Y in step S18, the operation in step S20 is executed. When the mark 42 is detected, as is easily inferred from the description about the image data WX, this image data WY should have a single peak at the center of the mark having the vertical length FV. However, similar to the case wherein maximum density data larger than a predetermined value cannot be obtained from a mark, whose horizontal length is not FH, of the image data WX from which the pixel WY is obtained, the maximum density data PY larger than the predetermined value YC cannot be obtained from a mark, whose vertical length is not FV, of the image data WY. That is, in step S20, a pixel from which the maximum density data PY is obtained is determined as the center of the rectangular mark whose horizontal and vertical lengths are substantially FH and FV, respectively.

In step S22, the CPU 11 prepares the conversion table (lookup table) 19. More specifically, the CPU 11 writes, in the table 19, first density data, e.g., 255 (or 1), with respect to a pixel having density data not less than a predetermined value (error) E, and writes second density data, e.g., 0, with respect to a pixel having density data less than a predetermined value E. In step S24, the CPU 11 outputs a data conversion command for the image data WY in the frame memory 12-7 to the data conversion processor 18. In response to the command from the CPU 11, the processor 18 reads out the density values of the respective pixels of the image data WY from the frame memory 12-7. By using the readout values as addresses, the processor 18 obtains the converted density data of the pixels by referring to the lookup table 19. The obtained density data are stored in the frame memory 12-8.

This mark detecting technique can be applied to character recognition. For example, in image data shown in FIG. 8, characters 51 to 54, which are present between two rectangular marks 41 and 42, and whose relative positions with respect to the marks 41 and 42 are known in advance, can be recognized by detecting the marks 41 and 42 from the image data.

In the above-described embodiment, a black mark on a white background is detected. When a white mark on a black background is to be detected, mark detection can be performed in the same manner as in the embodiment by replacing density data WId of each pixel of the digital image data WI with, e.g., (255−WId) in step S2. Alternatively, the differential filtering tables 31 and 32 may be exchanged with each other in step S4, and similarly, the differential filtering tables 33 and 34 may be exchanged in step S12.

If FH > FV, differential filtering is preferably performed in the opposite order to that of the embodiment, i.e., in the vertical and horizontal directions so as to increase the mark detection precision.

Differential filtering tables are not limited to the tables 31 to 34 shown in FIGS. 4A to 4D, respectively. For example, other differential filtering tables having different coefficients, such as tables 61 to 64 respectively shown in FIGS. 9A to 9D, or tables 71 to 74 respectively shown in FIGS. 10A to 10D, may be used.

In step S20, the position of the pixel having the maximum density data is determined as the central position of the mark. However, as shown in step S30, the center of gravity of pixels having density data equal to or larger than the predetermined value E may be calculated and determined as the center of the mark.

In addition, in the above embodiment, mark image data is generated by using the lookup table after the maximum density data is obtained. However, mark image data can be generated by using the peak positions of the image data WFX1, WFX2, WFY1, and WFY2.

Furthermore, in the above embodiment, for the sake of easy understanding, all the generated image data are respectively stored in the independent frame memories. However, the present invention is not limited to this. For example, the image data WX may be stored in the frame memory 12-1 (used to store the image data WI); the image data WFY1 and WFY2, in the frame memories 12-2 and 12-3 (respectively used to store the image data WFX1 and WFX2); the image data WY, in the frame memory 12-1; and the image data WO, in the frame memory 12-2 or 12 3. In this case, only the three frame memories 12-1 to 12-3 are used.

Moreover, in the above embodiment, after one image data is obtained, the next image data generation process is performed by using the obtained image data. However, if the image data bus 21 is increased in line number, a plurality of image data generation processes may be performed in parallel by pipeline processing. More specifically, parallel to the generation of the image data WFX2, generation of the image data WX using the image data WFX1 and WFX2 can be performed by pipeline processing. Parallel to the generation of the image data WX, generation of image data WFY1 can be performed by pipeline processing. Similarly, parallel to the generation of the image data WFY2, the image data WY can be generated by pipeline processing. If two differential filtering operation processors 15 are used, the image data WX can be generated by pipeline processing while the image data WFX1 and WFX2 are simultaneously generated. Hence, parallel to the generation of the image data WX, the image data WFY1 and WFY2 can be simultaneously performed by pipeline processing.

What is claimed is:

1. An apparatus for detecting, from original image data, mark image data corresponding to a mark and having a first length in a first direction and a second length in a second direction perpendicular to the first direction in unit of pixels, comprising:

differentiating means responsive to an input differential operation command, for executing a differential operation for density data of the original image data to obtain differential image data;

adding means responsive to an input addition command, for adding two differential image data with respect to density data of the two differential image data such that one differential image data is shifted by a designated length in a designated direction and the other differential image data is shifted by the designated length in an opposite direction to the designated direction; and control means responsive to an input mark detecting command, for designating the original image data to sequentially output first and second input differential operation commands to said differentiating means to obtain two first differential image data, respectively, designating the two first differential image data, a half of the first length as the designated length and the first direction as the designated direction to output a first input addition command to said adding means to obtain first added image data, designating the first added image data to sequentially output third and fourth input differential operation commands to said differentiating means to obtain two second differential image data, respectively, designating the two second differential image data, a half of the second length as the designated length and the second direction as the designated direction to output a second input addition command to said adding means to obtain second added image data, and calculating the center of gravity of pixels of the second added image data, each of which has density data larger than a predetermined value, to detect a central position of the mark.

2. An apparatus according to claim 1, wherein said differentiating means includes means for differentiating the original image data and the first added image data by referring to first to fourth differential tables in response to the first to fourth input differential operation commands, respectively.

3. An apparatus according to claim 2, wherein said first and third differential tables are designed to obtain a positive differential value when the density data of one of the original image data and the first added image data changes to increase, and said second and fourth differential tables are designed to obtain a positive differential value when the density data of one of the original image data and the first added image data changes to decrease.

4. An apparatus according to claim 1, further comprising means for changing the density data of the original image data to each value, which is obtained by subtracting each density data of the original image data from desired density data.

5. An apparatus according to claim 1, wherein said differentiating means includes means for differentiating the original image data and the first added image data by referring to said first to fourth differential tables in response to the first to fourth input differential operation commands, respectively, when the mark is black, and for differentiating the original image data and the first added image data by referring to said second, first, fourth, and third differential tables in response to the first to fourth input differential operation commands when the mark is white, respectively.

6. An apparatus according to claim 1, further comprising means for executing a histogram operation for the second added image data, and wherein said control means further comprises means for detecting a pixel having maximum density data of a histogram operation result as the central position of the mark.

7. An apparatus according to claim 1, further comprising:

a conversion table for storing conversion data; and conversion means for converting density data of each pixel of the second added image data into desired density data by referring to said conversion table, and wherein the said control means further comprises means for generating said conversion table.

8. A method of detecting, from original image data, mark image data corresponding to a mark in a mark detecting apparatus, the mark image data having a first length in a first direction and a second length in a second direction in unit of pixels, comprising the steps of:

executing first and second differential operations for the original image data in the first direction to obtain two first differential image data;

shifting the two first differential image data by ½ the first length in opposite directions and adding the shifted two first differential image data to obtain first added image data;

executing third and fourth differential operations for the first added image data in the second direction to obtain two second differential image data;

shifting the two second differential image data by ½ the second length in opposite directions and adding the shifted two second differential image data to obtain second added image data; and detecting the center of the mark from the second added image data, and wherein the detecting step includes the step of calculating the center of gravity of pixels of the second added image data, each of which has density data larger than a predetermined value.

9. An apparatus according to claim 8, wherein the step of executing the first and second differential operations further includes the step of performing a filtering operation simultaneously with the first and second differential operation.

10. An apparatus according to claim 8, wherein the step of executing the first differential operation includes the steps of:

differentiating the original image data in the first direction by referring to a first differential table; and differentiating the original image data in the first direction by referring to a second differential table.

11. A method according to claim 8, wherein the step of executing the third and fourth differential operations further includes the step of executing a filtering operation simultaneously with the third and fourth differential operations.

12. A method according to claim 8, wherein the step of executing the first and second differential operations, and the step of executing the third and fourth differential operations include the step of differentiating original image data and the first added image data by referring to said first and fourth differential tables in response to first and fourth differential operation commands when the mark is black, and differentiating original image data and the first added image data by referring to said second, first, fourth, and third differential tables in response to first to fourth differential operation commands when the mark is white.

13. A mark detecting apparatus comprising:

first differential filtering means for obtaining first and second differential image data by receiving original image data from which a rectangular mark having a first length in a first direction and a second length in a second direction is to be detected, and by performing two types of filtering operations for detecting degrees of increase and decrease in density in the first direction;

first adding means for obtaining first addition image data by shifting the first and second differential image data by ½ the first length in the first direction and in the opposite direction, and adding corresponding pixels;

second differential filtering means for obtaining third and fourth differential image data by receiving the first addition image data and by performing two types of filtering operations for detecting degrees of increase and decrease in density in the second direction;

second adding means for obtaining second addition image data by shifting the third and fourth differential image data in the second direction and in the opposite direction, and adding corresponding pixels together; and image data conversion means for determining a threshold value on the basis of the second addition image data to detect a central position of the rectangular mark by detecting a position of the first density in result image data, and obtaining the result image data by converting pixels of the second addition image data, which have densities not less than the threshold value, into the first densities, and converting other pixels into the second densities.

* * * * *